Figure 1:
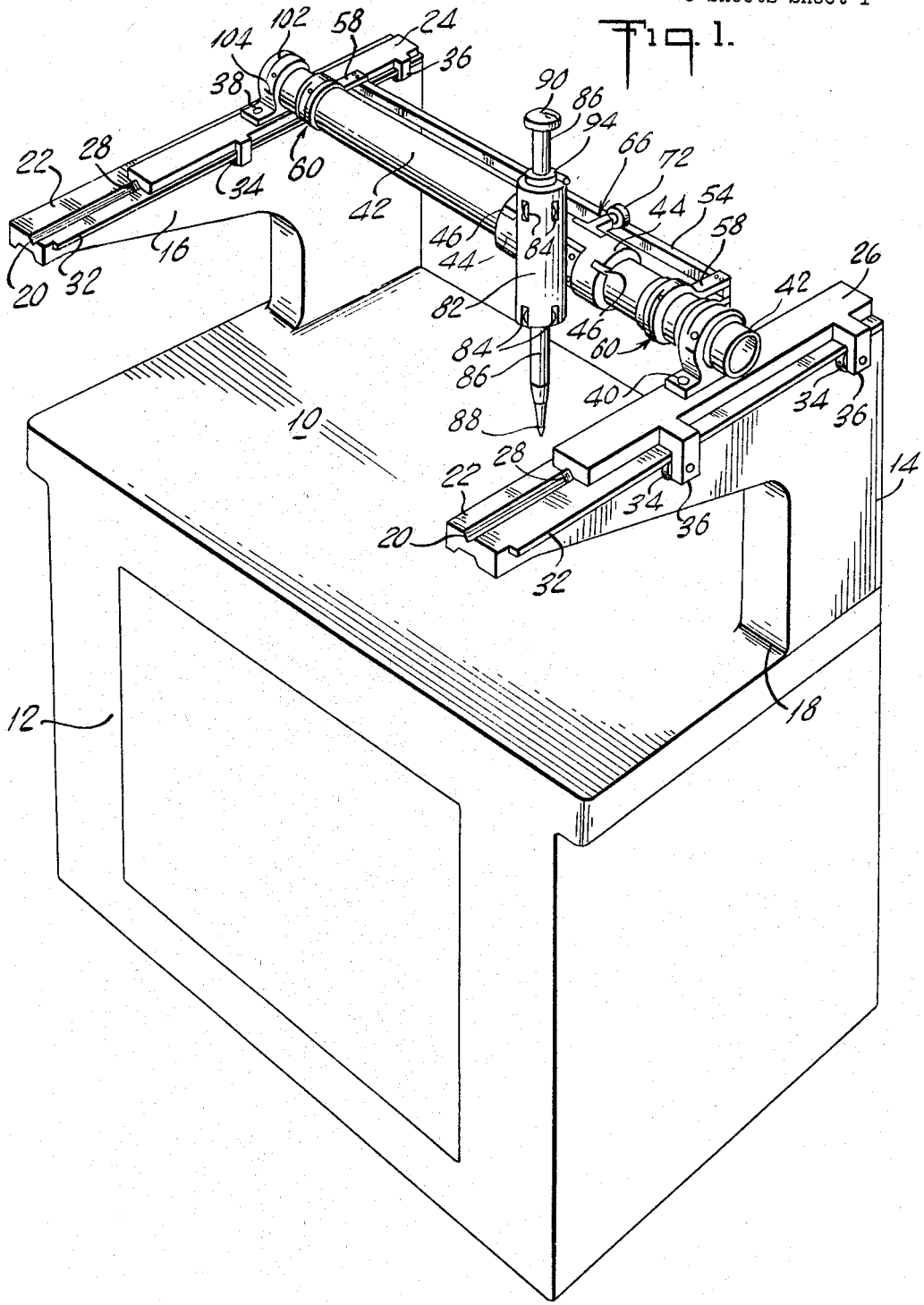

Nov. 22, 1966  J. T. POTTER  3,286,353
INSPECTION MACHINE
Filed Aug. 12, 1963  5 Sheets-Sheet 1

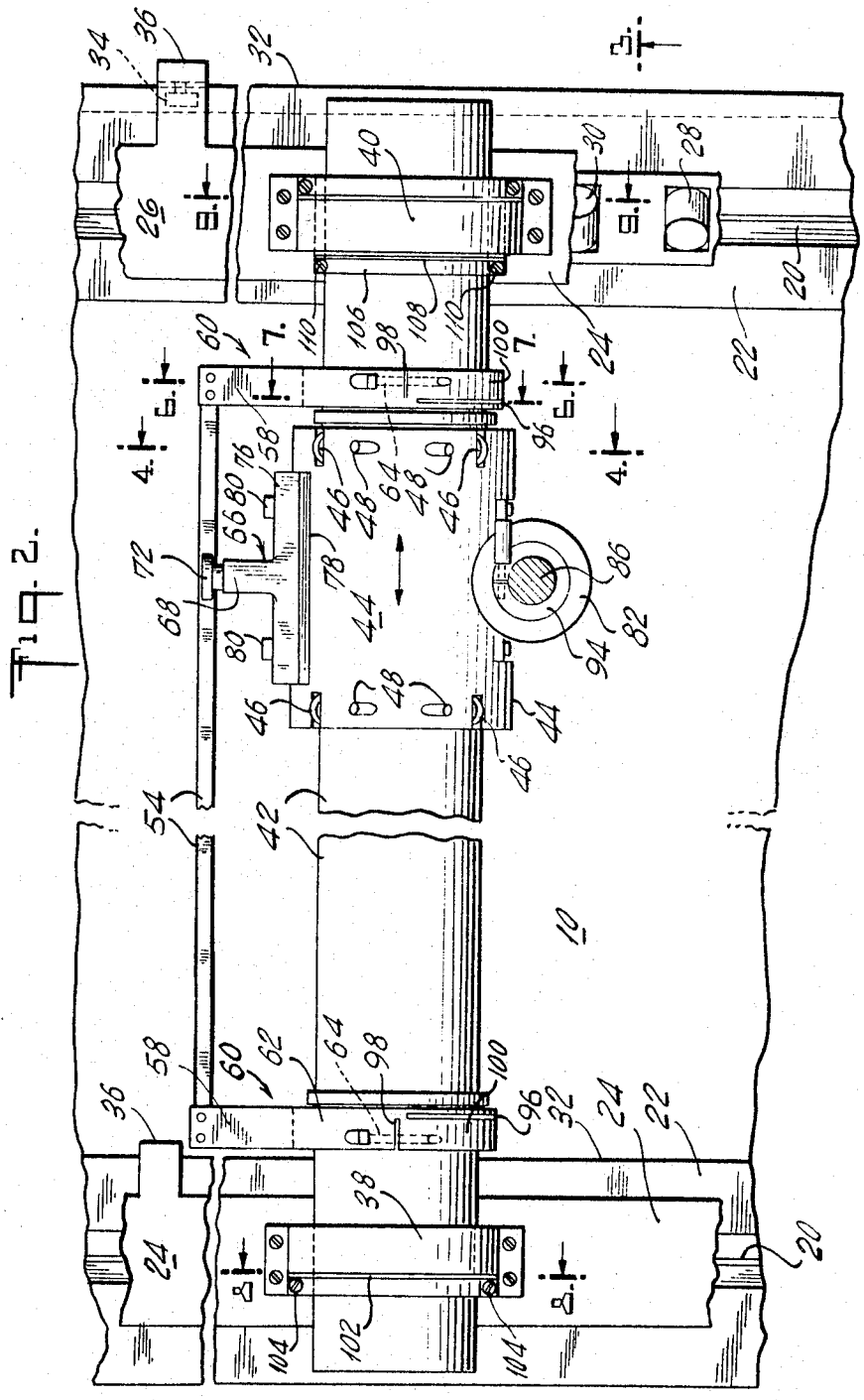

Nov. 22, 1966  J. T. POTTER  3,286,353
INSPECTION MACHINE
Filed Aug. 12, 1963  5 Sheets-Sheet 3
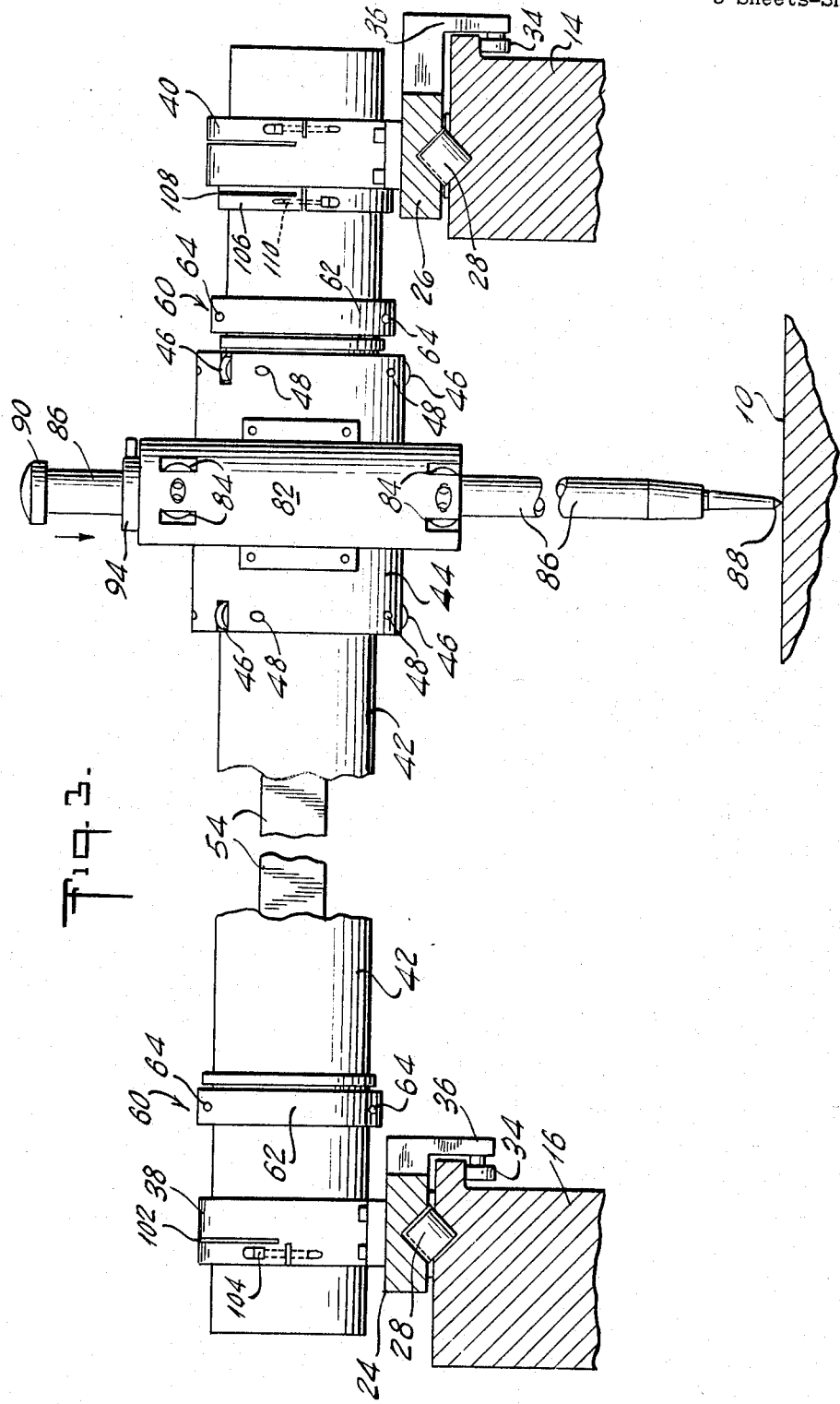

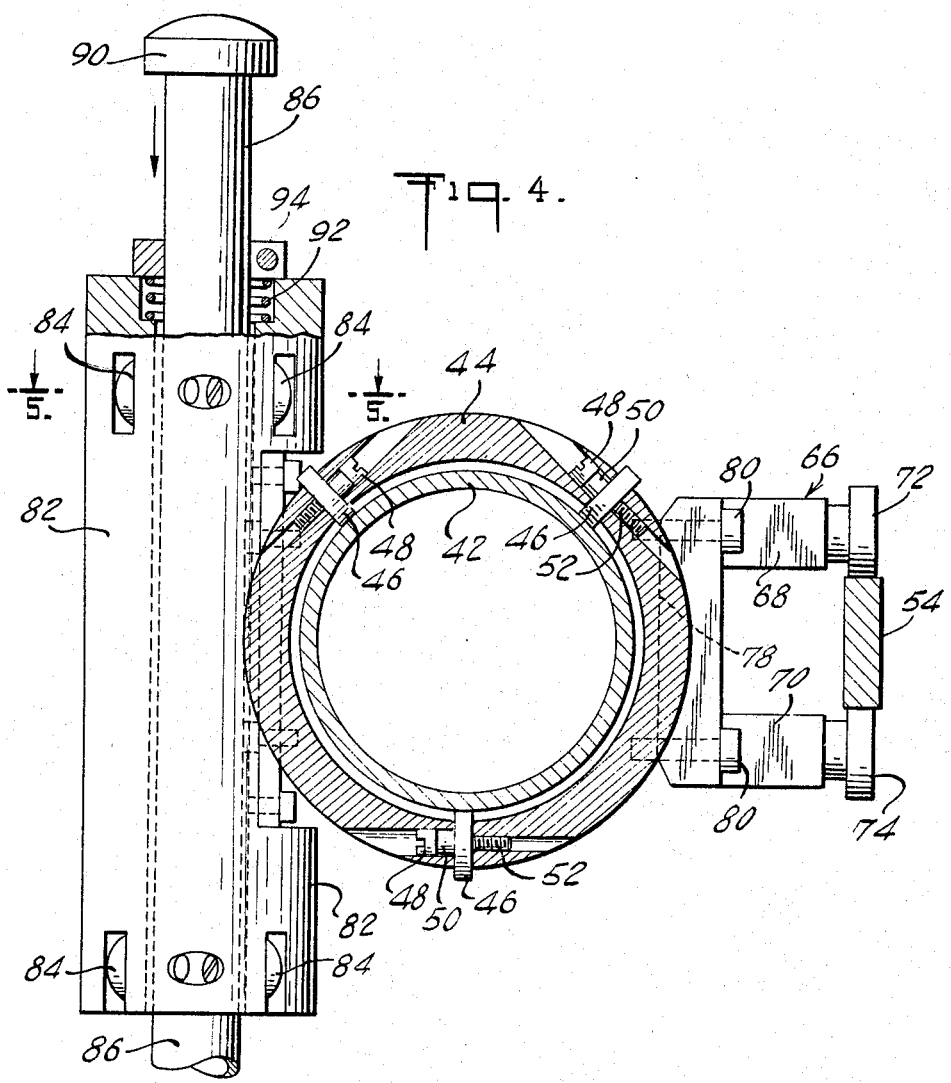
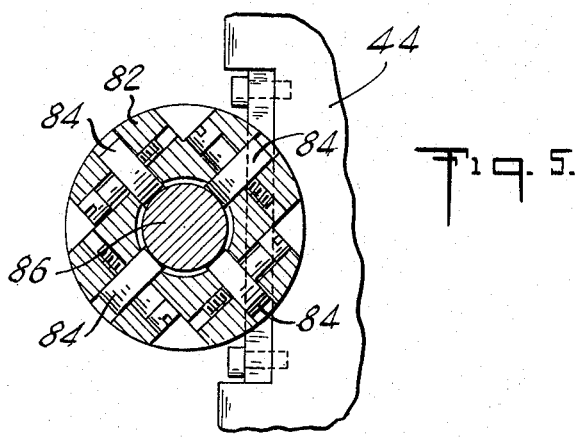

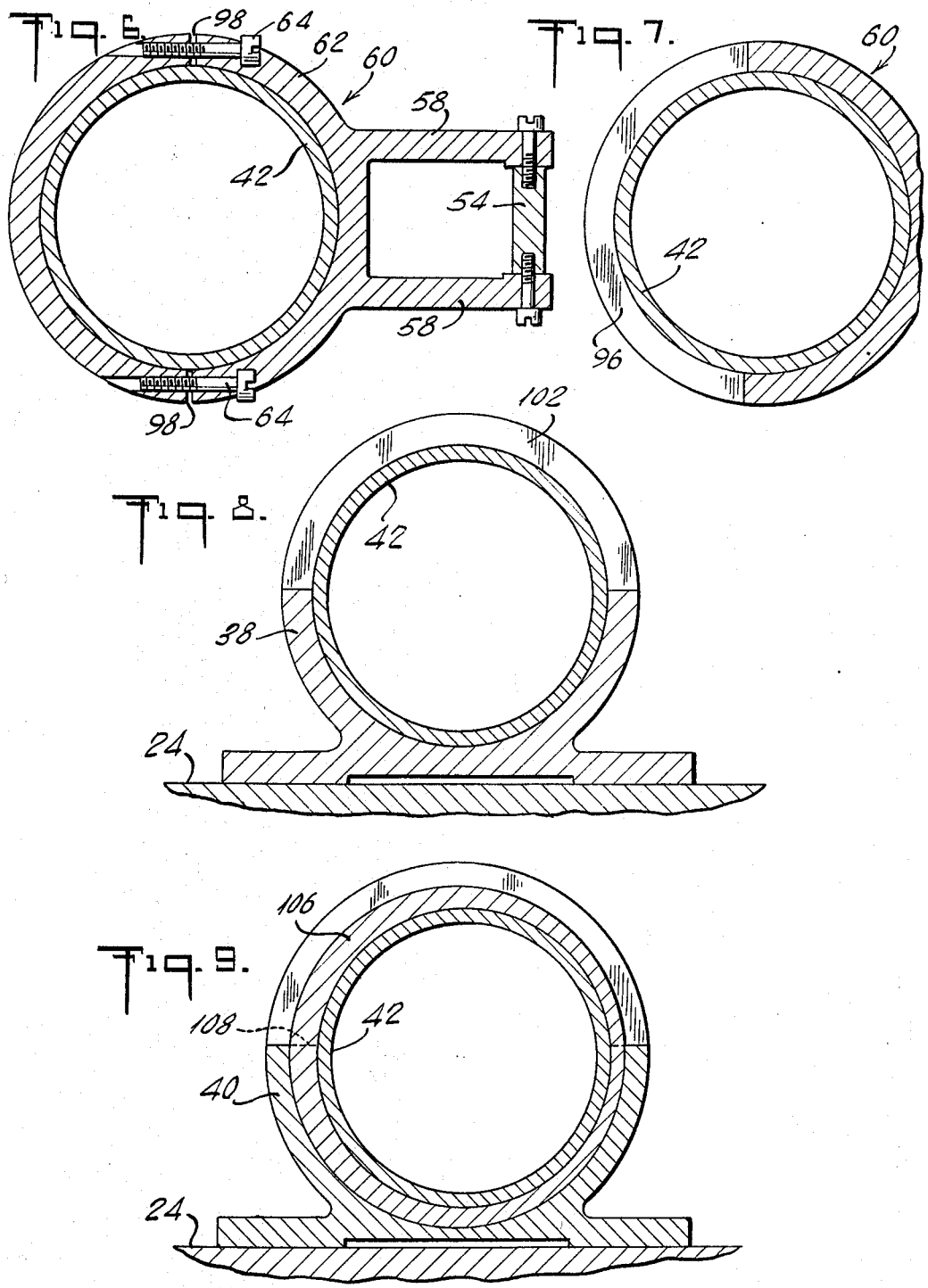

United States Patent Office 3,286,353
Patented Nov. 22, 1966

3,286,353
INSPECTION MACHINE
John T. Potter, Locust Valley, N.Y., assignor to Potter Instrument Company, Inc., Plainview, N.Y., a corporation of New York
Filed Aug. 12, 1963, Ser. No. 301,491
7 Claims. (Cl. 33—174)

This invention relates to sensors for measurement of coordinate distances and, more particularly, relates to an improved apparatus for mounting of the sensor so that the sensor can be moved along coordinate axes over a planar surface with precision.

In many applications as, for example, in the preparation of printed circuit boards and the like, it is desirable to provide sensors to measure the distances of holes for component mounting and the like along the respective coordinate axes to ensure that the board has been prepared properly for receipt of the components particularly when inserted by automatic insertion machinery.

It is conventional to measure the locations of the holes in the board from a reference position along mutually perpendicular coordinate axes. The sensor which may, for example, consist of a probe, is moved along coordinate axes to the hole position and when the probe is inserted in the aperture, the distances can be measured and used as, for example, by recording of the data or by data presentation for immediate checking.

The various apparatus for measurement of movement along the coordinate axes are known to the art. However, the mounting apparatus carrying the sensor has, in general, suffered from the drawback that the sensor mounting is not sufficiently precise to enable the measurement accuracies required by the art in a simple and easily handled apparatus.

It is therefore, the primary object of this invention to provide an apparatus for mounting a sensor for movement along coordinate axes over a planar surface which is simple in construction and which provides extreme rigidity and precision of mounting so that inadvertent deflection of the sensor cannot occur to destroy the measurement accuracies desired in such applications.

In accordance with this object, there is provided, in a preferred embodiment of this invention, an apparatus for mounting a sensor for movement along the coordinate axis over a planar surface which comprises a first and second rail assembly positioned in parallel relationship on each side of said surface. First and second trucks are provided for movement along each rail and means are provided to secure the trucks to the rail so as to provide accurate tracking of the trucks along the rail. A first and second clamp assembly is respectively provided on said first and second trucks to receive the ends of a tubular shaft extending therebetween. Clamp assemblies are fixedly clamped to the ends of the tubular shaft. A cylindrical sleeve is slidably mounted on said tubular shaft by roller bearings carried in said sleeve and contacting the shaft. The bearings are provided at each end of the sleeve and each bearing set provides three rollers spaced about the periphery of the sleeve. In this manner, the sleeve can be moved over the shaft without deflection.

In order to prevent relative rotation between the sleeve and the shaft, a beam is fixedly secured in parallel relationship to the shaft. A U-shaped bracket is fixedly coupled to the sleeve with the arms thereof positioned astraddle the beam. For low friction, the arms may be provided with rollers contacting said beam. Thus, movement of the sleeve along the shaft with low friction drag is permitted, but rotation of the sleeve on the shaft is prevented.

The sleeve carries the sensor which may, for example, comprise a probe housed in a cylindrical housing. The probe housing is coupled to the sleeve in fixed relationship thereto and is provided with a plurality of rollers at each end thereof. The probe consists of a cylindrical shaft contained within the housing and which can be urged against a spring bias into a downward position to engage the planar surface.

Having briefly described the invention, it will be described in greater detail along with other objects and advantages in the following detailed description of the invention, which may best be understood by reference to the accompanying drawings, of which:

FIG. 1 is a perspective view of the apparatus in accordance with the present invention;
FIG. 2 is a partially sectioned and broken away plan view of the apparatus shown in FIG. 1;
FIG. 3 is a partially sectioned elevation view taken along the lines 3—3 in FIG. 2;
FIG. 4 is a section view taken along lines 4—4 of FIG. 2;
FIG. 5 is a section view taken along lines 5—5 of FIG. 4;
FIG. 6 is a section view taken along lines 6—6 of FIG. 2;
FIG. 7 is a section view taken along lines 7—7 of FIG. 2;
FIG. 8 is a section view taken along lines 8—8 of FIG. 2; and
FIG. 9 is a section view taken along lines 9—9 of FIG. 2.

In the figures, there is shown the apparatus in accordance with this invention which comprises a planar surface 10 which is preferably rigid, heavily constructed table supported at a convenient working height by legs 12. At each side of the table 10, there is provided a rail assembly 14 and 16. The rail assemblies are mounted in parallel relationship on each side of the surface and are rigidly affixed to the table 10. As shown, the rail assemblies may be welded as at the weld fillet 18 or may be securely bolted to the table. The rail assemblies are provided with V-shaped ways 20. The surfaces 22 of the rail assemblies and the ways 20 are machined accurately so as to provide parallel tracks in the same plane, which plane is parallel to the plane of the surface 10. A first and second end truck 24 and 26 respectively is mounted for movement over the track. In order to provide accurate and easy movement of the trucks over the tracks, roller bearings 28 and 30 (FIGURE 2) are mounted alternately with mutually perpendicular axes so as to engage both sides of the V-ways 20. To further prevent deflection of the trucks from the path established by the ways, a parallel flange 32 is provided on each rail assembly, the underside of which is engaged by rollers 34 carried by the clamp arms 36 thereby to clamp the trucks on the rail assemblies. A first clamp assembly 38 and a second clamp assembly 40 is respectively mounted on the first and second end trucks 24 and 26 respectively. A tubular hollow shaft 42 extends between the end trucks and the ends thereof are clamped by the first and second clamp assemblies 38 and 40 respectively.

The tubular shaft 42 is relatively large in diameter to provide a rigid beam structure with a relatively lightweight assembly.

A sleeve 44 is slidably mounted on the shaft 42. A bearing assembly is provided at each end of the sleeve. Each bearing assembly comprises a roller 46 mounted in the sleeve (as shown in FIGURE 4). The bearing assemblies comprise three rollers 46 spaced about the periphery of the sleeves and have the peripheral surfaces of the rollers engaging the shaft 42. By mounting the bearing assemblies at each end of the sleeve, displacement of the sleeve with respect to the shaft is prevented and accurate tracking of the sleeve across the shaft is provided. The rollers are simply mounted in the sleeve by screws 48 having a shank 50 on which the rollers ride and having a threaded portion 52 to hold the screw into the sleeve.

In order to prevent the sleeve 44 from rotating about the shaft 42 in a simple and easily constructed manner, there is provided a beam 54 fixedly mounted between the arms 58 of the two beam support members 60. Each of the support members 60 is provided with a clamp ring 62 which is clamped securely on the shaft 42 by screws 64. In this manner, the alignment of the beam in parallel relationship to the axis of the shaft may be easily adjusted and clamped thereto into position.

To prevent rotation of the sleeve, the sleeve is provided with a U-shaped bracket 66, the arm 68 and 70 of which are positioned astraddle the beam 54. To reduce the frictional drag, each arm is provided with a roller bearing 72 and 74 respectively, the periphery of which engages the opposite sides of beam 52. The clamp assembly 66 is provided with a mounting plate 76 and is securely attached to the flat 78 on sleeve 44 by bolts 80.

The sensor is carried on sleeve 44 and comprises a cylindrical housing 82 at each end of which bearings 84 are mounted to provide the desired rigid axial sliding support for a central cylindrical probe 86. The probe is provided with a sharpened point 88 and a cap 90 at the opposite end. When the operator reaches a point on, for example, a printed circuit board positioned on table 10, he presses the cap which forces down the probe against the bias asserted by spring 92 on the clamp ring 94 to move the point 88 of the probe into the hole being measured. The arrangement for measurement of the displacement of the sensor along the $x$ and $y$ coordinates is not shown since conventional measuring apparatus may be used and illustration of such apparatus would complicate and obsure the present invention.

The clamp assemblies 62 are formed of an annular section having a radially extending slot 96 cut therein at an off-center position and a transversely extending slot 98. The screw 64 extends across slot 98 and as the screw is tightened, it will draw the section 100 into clamping engagement with the shaft 94 deflecting the material by opening slot 96.

Clamp assembly 38 similarly comprises an annular ring having a radially extending slot 102 cut therein and a transversely extending slot across screws 104.

For precision of mounting of the shaft assembly so that it is parallel to the plane of surface 10 despite slight errors in machining of the component parts, the clamp assembly 40 is provided with a first clamping section 106. This section is constructed in like manner having a radially extending slot 108 and transversely extending slots across which screws 110 are positioned. However, the outer surface of the clamp assembly 106 is eccentric to the inner surface. The outer surface is positioned within a clamp assembly 108 of similar construction to clamp assembly 38. In this manner, the clamp assembly 106 may be rotated and, due to the eccentricity, will adjust the end of the shaft 42 with respect to the other end thereby to provide a means for accurately providing parallelism between the shaft and the surface 10. This adjustment is adequate to take up for manufacturing tolerances. When the desired alignment is reached, clamp assembly 106 is clamped on the shaft and clamp assembly 108 is clamped on the clamp assembly 106 to provide a rigid support structure.

Thus, in this manner, there is provided apparatus for mounting a sensor which can be moved along coordinate axes over a planar surface. Although the sensor can be moved easily and without excessive frictional drag, which would make positioning difficult, the sensor is rigidly coupled and is carried in a manner preventing deflection of the sensor which would introduce measurement error. As, for example, the probe can be moved over punched holes in a circuit board and when the probe is actuated by depressing the plunger to insert the sharpened tip thereof into the hole, the measurement apparatus can be actuated with confidence that the probe is not deflected from its desired position.

The measurement of probe movement can be accomplished by measurement apparatus known to the art. Further, electronic circuitry to indicate movement of the probe along the coordinate axes is disclosed in my copending application Serial No. 278,587, filed May 7, 1963 and now Patent No. 3,184,600, which is incorporated herein by reference.

This invention may be variously modified and embodied within the scope of the subjoined claims.

What is claimed is:

1. Apparatus for mounting a sensor for movement along coordinate axes over a planar surface having a front edge, a back edge and two side edges, comprising a first and second rail assembly positioned in parallel relationship on each side edge of said planar surface adjacent the back edge and extending upwardly above said planar surface a predetermined distance and including a portion extending forwardly in a cantilever manner toward a line over said front edge of said planar surface, each of said rail assemblies having a guide rack and a parallel flange on said cantilever portion, a first and second end truck movably mounted on said respective first and second tracks, each of said end trucks having a clamp arm including a roller guide to engage the respective flange to hold said truck to said rail, a first clamp assembly mounted on said first truck, a second clamp assembly mounted on said second truck, a tubular shaft extending between said trucks with the ends of said shaft being rigidly clamped by said first and second clamp assemblies respectively, a sleeve peripherally surrounding said shaft, a roller bearing set at each end of said sleeve, each roller bearing set comprising three roller bearings equally spaced around the periphery of said sleeve, each of said roller bearings being rotatably mounted in said sleeve with the periphery of said bearing in rolling engagement with the surface of said shaft, whereby said sleeve is movable along said shaft but is restrainedly mounted against deflection forces, a beam fixedly mounted in parallel relationship to said shaft, said sleeve having a U-shaped bracket fixedly mounted thereon, the arms of said U-shaped bracket slidably engaging each side of said beam to restrain rotation of said sleeve about the shaft, and means for mounting said sensor on said sleeve.

2. Apparatus in accordance with claim 1 in which said rail assembly comprises a V-shaped way and in which said truck assembly is provided with a V-shaped way cut therein and in which a plurality of roller bearings are provided between said respective ways for rolling engagement therebetween.

3. Apparatus in accordance with claim 2 in which the axes of said roller bearings are alternately displaced at 90°.

4. Apparatus in accordance with claim 1 in which said sensor comprises a cylindrical housing, said housing being fixedly secured to said sleeve, a bearing assembly positioned at each end of said housing, a cylindrical plunger reciprocally mounted within said housing during the reciprocation of which said bearing assemblies guidedly engage said plunger.

5. Apparatus in accordance with claim 4 which includes a biasing spring to bias said plunger upwardly.

6. Apparatus for mounting a sensor for movement along coordinate axes over a planar surface comprising a first and second rail assembly positioned in parallel relationship on each side of said surface, each of said rail assemblies having a guide track and a parallel flange, a first and second end truck movably mounted on said respective first and second tracks, each of said end trucks having a clamp arm including a roller guide to engage the respective flange to hold said truck to said rail, a first clamp assembly mounted on said first truck, a second clamp assembly mounted on said second truck, a tubular shaft extending between said trucks with the ends of said shaft being rigidly clamped by said first and second clamp assemblies respectively, a sleeve peripherally surrounding said shaft, a roller bearing set at each end of said sleeve, each roller bearing set comprising three roller bearings equally spaced around the periphery of said sleeve, each of said roller bearings being rotatably mounted in said sleeve with the periphery of said bearing in rolling engagement with the surface of said shaft, whereby said sleeve is movable along said shaft but is restrainedly mounted against deflection forces, a beam fixedly mounted in parallel relationship to said shaft, said sleeve having a U-shaped bracket fixedly mounted thereon, the arms of said U-shaped bracket slidably engaging each side of said beam to restrain rotation of said sleeve about the shaft, and means for mounting said sensor on said sleeve, said first clamp assembly comprises a cylindrical body having a radially extending slot cut therein for less than one-half the periphery thereof, an axially extending slot cut from one end into said surface at the ends of said radial slot but separated therefrom, and which includes clamp screws extending across said axially extending slots to clamp said clamp assembly by tightening said screws and deflection of the material defined by said slots.

7. Apparatus for mounting a sensor for movement along coordinate axes over a planar surface comprising a first and second rail assembly positioned in parallel relationship on each side of said surface, each of said rail assemblies having a guide track and a parallel flange, a first and second end truck movably mounted on said respective first and second tracks, each of said end trucks having a clamp arm including a roller guide to engage the respective flange to hold said truck to said rail, a first clamp assembly mounted on said first truck, a second clamp assembly mounted on said second truck, a tubular shaft extending between said trucks with the ends of said shaft being rigidly clamped by said first and second clamp assemblies respectively, a sleeve peripherally surrounding said shaft, a roller bearing set at each end of said sleeve, each roller bearing set comprising three roller bearings equally spaced around the periphery of said sleeve, each of said roller bearings being rotatably mounted in said sleeve with the periphery of said bearing in rolling engagement with the surface of said shaft, whereby said sleeve is movable along said shaft but is restrainedly mounted against deflection forces, a beam fixedly mounted in parallel relationship to said shaft, said sleeve having a U-shaped bracket fixedly mounted thereon, the arms of said U-shaped bracket slidably engaging each side of said beam to restrain rotation of said sleeve about the shaft, and means for mounting said sensor on said sleeve, said second clamp assembly comprises a first clamp ring assembly positioned on said shaft, said first clamp ring assembly having a cylindrical configuration with the inner circumference thereof eccentrically positioned with respect to the outer circumference and a second clamp ring assembly encircling said eccentric clamp ring assembly, each of said clamp ring assemblies comprising a cylindrical body portion having a radially extending slot cut therein for less than one-half of the periphery thereof, an axially extending slot cut into said body from one end thereof, at each of said radially extending slot, but separated therefrom, and screw means extending across said axially extending slot for clamping said clamp ring assemblies.

References Cited by the Examiner

UNITED STATES PATENTS

| | | | |
|---|---|---|---|
| 1,370,645 | 3/1921 | Hawkes | 33—189 |
| 1,927,992 | 9/1933 | Pulver | 33—189 |
| 2,057,516 | 10/1936 | Favre | 33—174 |
| 2,336,626 | 12/1943 | Mott | 33—23 |
| 2,787,838 | 4/1957 | Tucker | 33—174 |
| 2,943,393 | 7/1960 | Insolio | 33—23 |
| 2,995,826 | 8/1961 | Brault | 33—189 |
| 3,137,942 | 6/1964 | Powers | 33—80 |
| 3,139,296 | 6/1964 | Greene | 287—52 |

LEONARD FORMAN, *Primary Examiner.*